US010671758B2

United States Patent
Joisha (10) Patent No.: US 10,671,758 B2
(45) Date of Patent: Jun. 2, 2020

(54) REDACTING CORE DUMPS BY IDENTIFYING MODIFIABLE PARAMETERS

(71) Applicant: EntIT Software LLC, Sunnyvale, CA (US)

(72) Inventor: Pramod Joisha, Saratoga, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 216 days.

(21) Appl. No.: 15/691,334

(22) Filed: Aug. 30, 2017

(65) Prior Publication Data
US 2019/0065780 A1 Feb. 28, 2019

(51) Int. Cl.
*G06F 21/62* (2013.01)
*G06F 11/07* (2006.01)
*G06F 11/36* (2006.01)

(52) U.S. Cl.
CPC ...... *G06F 21/6254* (2013.01); *G06F 11/0778* (2013.01); *G06F 11/362* (2013.01); *G06F 2221/2107* (2013.01)

(58) Field of Classification Search
CPC ......... G06F 21/6254; G06F 2221/2107; G06F 11/362; G06F 11/0778
USPC .......................................................... 726/26
See application file for complete search history.

(56) References Cited

U.S. PATENT DOCUMENTS

| 6,128,774 | A * | 10/2000 | Necula | G06F 9/44589 |
| | | | | 717/126 |
| 9,223,995 | B1 * | 12/2015 | Lavinio | G06F 21/606 |
| 9,477,845 | B2 | 10/2016 | Boivie et al. | |
| 9,529,662 | B1 | 12/2016 | Wangkhem et al. | |
| 9,552,272 | B1 * | 1/2017 | Liang | G06F 11/0778 |
| 10,049,227 | B1 * | 8/2018 | Sampson | G06F 21/6254 |
| 10,318,261 | B2 * | 6/2019 | Rajnak | G06F 8/51 |
| 2003/0088860 | A1 * | 5/2003 | Wang | G06F 8/443 |
| | | | | 717/153 |
| 2003/0131284 | A1 * | 7/2003 | Flanagan | G06F 8/75 |
| | | | | 714/38.1 |
| 2004/0093397 | A1 * | 5/2004 | Chiroglazov | G06F 21/125 |
| | | | | 709/219 |
| 2004/0153661 | A1 * | 8/2004 | Graunke | G06F 21/125 |
| | | | | 713/194 |
| 2006/0059016 | A1 * | 3/2006 | Ogilvie | G06F 21/6245 |
| | | | | 705/2 |
| 2007/0011666 | A1 * | 1/2007 | Tan | G06F 9/45516 |
| | | | | 717/140 |
| 2007/0044075 | A1 * | 2/2007 | Koning | G06F 8/70 |
| | | | | 717/122 |
| 2007/0168745 | A1 * | 7/2007 | Alam | G06F 11/3414 |
| | | | | 714/38.14 |

(Continued)

OTHER PUBLICATIONS

DWARF Debugging information Format, Version 5" at http://www.dwarfstd.org downloaded Aug. 30, 2017 (1 page).

(Continued)

*Primary Examiner* — Aravind K Moorthy (57) ABSTRACT

A technique includes identifying a statement of a program based on a category that is associated with a sensitive-information category. The technique includes, based on a variable that is contained in the program statement, identifying at least one modifiable parameter (MP) of the program; and obfuscating a portion of a memory image associated with the program based on the identified MP.

20 Claims, 5 Drawing Sheets

(56) References Cited

U.S. PATENT DOCUMENTS

| | | | |
|---|---|---|---|
| 2009/0070881 A1* | 3/2009 | Yellepeddy | G06F 21/6245 726/26 |
| 2009/0172409 A1* | 7/2009 | Bullis | G06F 21/50 713/189 |
| 2010/0313239 A1* | 12/2010 | Chakra | G06F 21/6218 726/2 |
| 2012/0239987 A1* | 9/2012 | Chow | G06F 9/45533 714/49 |
| 2012/0284688 A1* | 11/2012 | McLachlan | G06F 21/125 717/110 |
| 2012/0303558 A1* | 11/2012 | Jaiswal | G06N 20/00 706/12 |
| 2013/0054650 A1* | 2/2013 | O'Byrne | G06F 21/6254 707/793 |
| 2013/0185803 A1* | 7/2013 | Travis | G06F 21/6263 726/26 |
| 2013/0191650 A1* | 7/2013 | Balakrishnan | G06F 21/6227 713/190 |
| 2013/0227354 A1* | 8/2013 | Shah | G06F 11/362 714/48 |
| 2013/0282951 A1 | 10/2013 | Kuo | |
| 2014/0165030 A1* | 6/2014 | Chevallier-Mames | G06F 21/14 717/110 |
| 2015/0143533 A1* | 5/2015 | Colnot | G06Q 20/3227 726/26 |
| 2015/0254456 A1* | 9/2015 | Jacquin | G06F 21/6245 726/1 |
| 2015/0256556 A1* | 9/2015 | Kaminsky | H04L 63/168 726/23 |
| 2016/0006703 A1 | 1/2016 | Boivie et al. | |
| 2016/0147516 A1* | 5/2016 | Rajnak | G06F 16/2455 717/150 |
| 2016/0179660 A1* | 6/2016 | Young | G06F 8/70 717/126 |
| 2016/0188317 A1* | 6/2016 | Hilliar | G06F 8/65 717/172 |
| 2016/0246992 A1* | 8/2016 | Brutschy | G06F 21/6245 |
| 2016/0269417 A1* | 9/2016 | Saxena | H04L 63/102 |
| 2017/0187690 A1* | 6/2017 | Lancioni | H04L 63/0428 |
| 2017/0213027 A1* | 7/2017 | Gu | G06F 21/556 |
| 2017/0243019 A1* | 8/2017 | Bailey | G06F 21/6245 |
| 2017/0308712 A1* | 10/2017 | Chari | G06F 21/577 |
| 2017/0351847 A1* | 12/2017 | Zvenigorodsky | G06F 21/14 |
| 2017/0366510 A1* | 12/2017 | Abebe | H04L 63/20 |
| 2018/0097829 A1* | 4/2018 | Muttik | H04L 63/1425 |
| 2018/0137272 A1* | 5/2018 | Kamal | H04W 4/80 |
| 2018/0337768 A1* | 11/2018 | Minner | H04L 9/0618 |

OTHER PUBLICATIONS

Glerum et al., Debugging in the (Very) Large: Ten Years of Implementation and Experience, Oct. 2009 (17 pages).

Silva, Josef, "A Vocabulary of Program Slicing-based Techniques," In ACM Computing Surveys, vol. 44, No. 3, Jun. 2012 (48 pages).

Wikipedia, "Core Dump" last edited Apr. 30, 2017 (4 pages).

Wikipedia, "Format-preserving encryption" last edited on Jul. 22, 2017 (8 pages).

Wikipedia, "Program slicing" last edited on Jul. 24, 2017 (3 pages).

Basra, Manvir Singh; SSL Overview/OpenSSL—Cryptography & SSL/TLS Toolkit/ Keytool; https://www.manvirbasra.com/ssl-overview-openssl-cryptography-ssltls-toolkit-resource/; downloaded on Aug. 21, 2019; 4 pp.

Bellare, Mihir; "Format-Preserving Encryption"; In Proc. International Workshop on Selected Areas in Cryptography; Aug. 2009; pp. 295-312, 18 pp.

Bergeretti, J. and Carre, B. A.; "Information-Flow and Data-Flow Analysis of while-Programs"; In ACM Transactions on Programming Languages and Systems, vol. 7, No. 1, pp. 37-61, 25 pp.

Weiser, Mark; "Program Slicing"; IEEE Transactions on Software Engineering, vol. SE-10, No. 4, Jul. 1984; pp. 352-357, 6 pp.

Wikipedia; "Executable and Linkable Format"; downloaded Aug. 21, 2019; 14 pp.

Xiao, Liangliang; "Security Analysis and Enhancement for Prefix-Preserving Encryption Schemes"; IL YEN-IACR Cryptology ePrint Archive, 2012, ePrint.iacr.org-2012; 19 pp.

\* cited by examiner

REDACTING CORE DUMPS BY IDENTIFYING MODIFIABLE PARAMETERS

BACKGROUND

One way for a software developer to debug and improve the performance of a software product is for the developer to receive feedback from customers who use the product. For example, one type of feedback is a core dump, which refers to a dataset that represents a recorded state of memory of a computer at a specific time, such as a time at which the software product crashes or abruptly terminates. The customers may be unwilling, however, to provide such information to the developer, as the core dump may contain data that represents sensitive information, such as social security numbers, plaintext passwords, Internet Protocol (IP) addresses, and so forth.

DETAILED DESCRIPTION

In accordance with example implementations, data that represents sensitive information (bank account numbers, credit card numbers, salaries, confidential information, IP addresses, and so forth) may be identified and redacted from a core dump. Accordingly, a customer may provide the redacted core dump to a software developer so that the developer may analyze the core dump (for purposes of enhancing performance of a software product, diagnosing or solving issues identified by a customer, debugging the product, and so forth), and the secrecy of the sensitive information is preserved.

In the context of this application, a "core dump" refers to a dataset that represents a state of a physical machine due to the execution of machine-executable instructions (i.e., "software") on the machine. As examples, the core dump may include data representing the state of a thread, a process, or a memory, and so forth due to the execution of the instructions. In general, the core dump may include data that represents such information as the states of processes, states of stack pointers, memory management information, states of the operating system, and so forth.

The sensitive information may be associated with certain modifiable parameters (MPs) of the machine-executable instructions. In accordance with example implementations, the instructions are analyzed to identify the MPs; and data representing attributes of the MPs are stored, so that, should a core dump occur, sensitive data may be redacted based on the MP attribute data (i.e., data representing attributes of the MPs, as further described herein). In this context, a "modifiable parameter" (MP) refers to an input or output, which may be changed due to user input or interaction with a particular software product. Moreover, the MPs may be classified such that some of the MPs may be associated with categories (called "obfuscation categories" herein) of potentially sensitive information, i.e., categories, or divisions of data, which the customer may not want to expose to a developer of the software product via a core dump. As examples, the obfuscation categories may include one or more of the following categories: credit card numbers, bank account numbers, salaries, IP addresses, plaintext passwords, or any other category that may be associated with sensitive or confidential information or may be designated by the user as being an obfuscation category.

More specifically, in accordance with example implementations, an MP identification engine analyzes the source code of a given software product (an application, a device driver, database management software, a library function, and so forth) during compilation of the source code for purposes of identifying MPs that are associated with one or multiple obfuscation categories. The MP identification engine may store information pertaining to the identified MPs so that should a core dump occur, a core dump redactor may retrieve this information and use the information to identify data of the core dump to be redacted (i.e., identify data representing sensitive information) before the core dump is sent by a software user or customer to a third party (sent to a software developer for analysis, for example).

Moreover, in accordance with example implementations, the core dump redactor may use FPE to encrypt the identified data to effectively redact the data. In other words, the core dump redactor may replace data representing the sensitive information with encrypted data. In general, FPE refers to a type of encryption in which the format of the plaintext data (i.e., the data representing the unencrypted sensitive information) is preserved in the corresponding encrypted, or ciphertext data. For example, for a sixteen-digit, plaintext credit card number, FPE may provide a corresponding sixteen-digit ciphertext. Although the redacted data may not be used in the analysis of the core dump by the software developer, the analysis may rely on the format of the redacted core dump being the same as the core dump before redaction. As such, the redacted core dump preserves the secrecy of the customers sensitive information, while preserving the format of the unredacted core dump for purposes of allowing debugging or other analysis of the redacted core dump.

Figure 1:
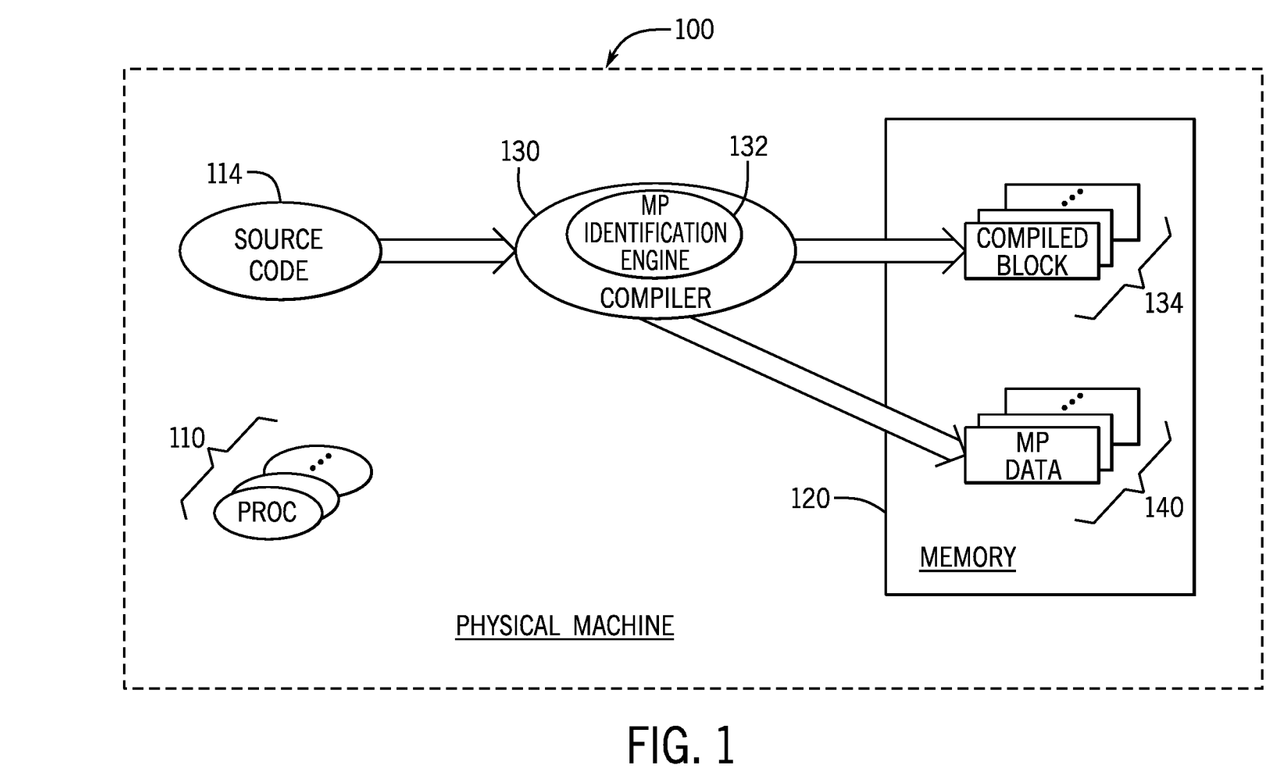
FIG. 1 is a schematic diagram of a physical machine including an engine to identify in source code modifiable parameters (MPs) associated with obfuscation categories according to an example implementation.

As a more specific example, FIG. 1 depicts a physical machine 100 in accordance with example implementations. In general, the physical machine 100 is an actual machine that includes actual hardware, such as one or multiple processors 110 (one or multiple central processing units (CPUs), one or multiple CPU cores, and so forth) and a memory 120. The memory 120 is a non-transitory memory, which may be formed from, as examples, semiconductor storage devices, magnetic storage devices, volatile memory devices, nonvolatile memory devices, memristors, phase change memory devices, a combination of one or more of the foregoing memory storage technologies, as well as other storage devices that are associated with other memory storage technologies.

The physical machine 100, as examples, may be a desktop computer, a client server, a machine formed from components (server blades, for example) disposed on a rack or multiple racks, multiple components disposed at different geographical locations, multiple components disposed at the same geographical location, networked components, and so forth. Regardless of its particular form, the processor(s) 110 of the physical machine 100 may execute machine-executable instructions (or "software"), which may be derived from program instructions, or source code 114. In accordance with some implementations, a compiler 130 of the physical machine 100 may compile the source code 114 to produce corresponding compiled intermediate execution blocks 134 of machine-executable instructions, which are executed by the one or multiple processors 110.

As part of this compilation process, in accordance with example implementations, an MP identification engine 132 of the compiler 130, during the compilation process, identifies MPs associated with the source code 114 and stores corresponding data 140 in the memory 120 representing the MPs. In this context, an MP refers to a modifiable input or output associated with the source code 114, i.e., an input or output that may be changed, or modified due to user input or interaction. Moreover, in accordance with example implementations, the MP is associated with a particular sensitive-information category, or obfuscation category. In general, the MP identification engine 132 identifies MPs, which are associated with particular designated obfuscation categories. In other words, the MPs are associated with potential data in a core dump, which may contain sensitive information.

Figure 2:
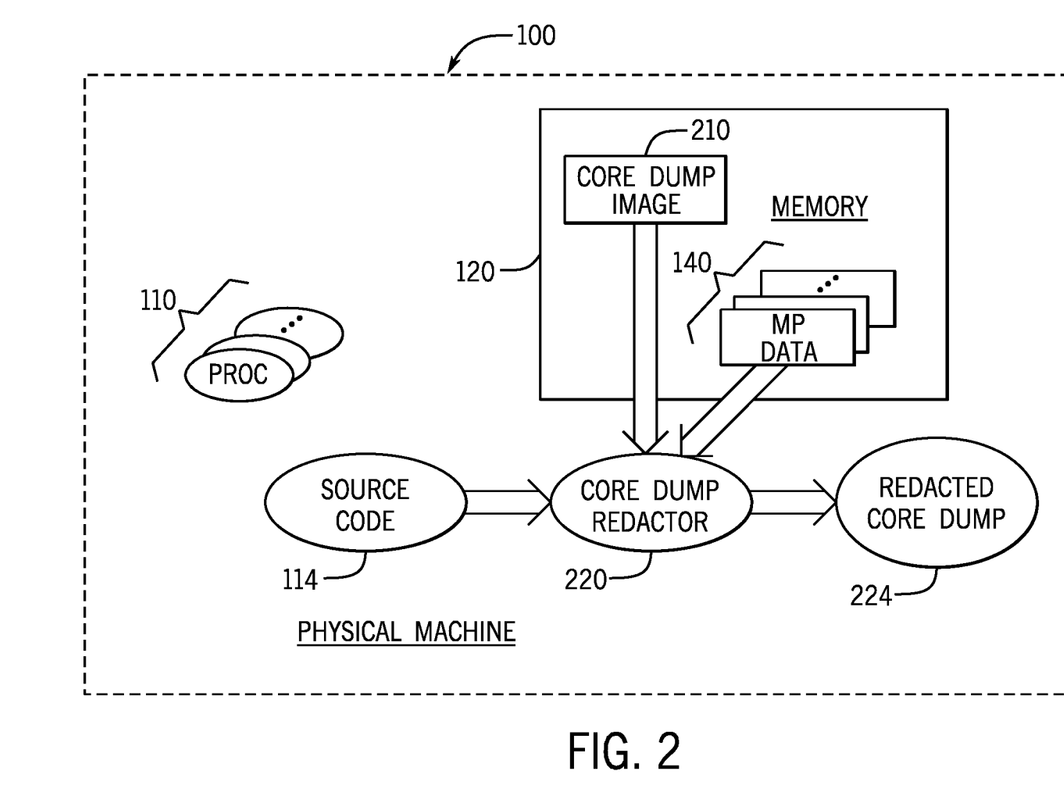
FIG. 2 is a schematic diagram of the physical machine illustrating generation of a format-preserving encryption (FPE)-based redacted core dump based on MPs identified in source code according to an example implementation.

Referring to FIG. 2, in accordance with example implementations, a core dump redactor 220 of the physical machine 100 may, in response to a core dump analysis being performed on the physical machine 100, use the MP data 140 to, in conjunction with the source code 114, determine memory locations at which the core dump may contain sensitive information. In this manner, for the example implementation that is depicted in FIG. 2, the core dump may include, for example, data associated with an image 210 that is stored in the memory 120. In general, the core dump redactor 220 identifies memory locations with sensitive data based on the MP data 140 and correspondingly encrypts the contents of these locations using FPE to produce an FPE-based, redacted core dump 224.

It is noted that, in accordance with example implementations, the various components discussed herein, such as the compiler 130, the MP identification engine 132, the core dump redactor 220, and so forth, may be software-based components, which are formed by corresponding sets of machine-executable instructions that are executed by one or multiple processors 110 of the physical machine 100. However, in accordance with further example implementations, any of these components may be hardware or circuit-based and not be formed through the execution of machine-executable instructions. For example, in accordance with some implementations, a given component described herein may be formed from a Field Programmable Gate Array (FPGA), an Application Specific Integrated Circuit (ASIC), and so forth.

Figure 3:
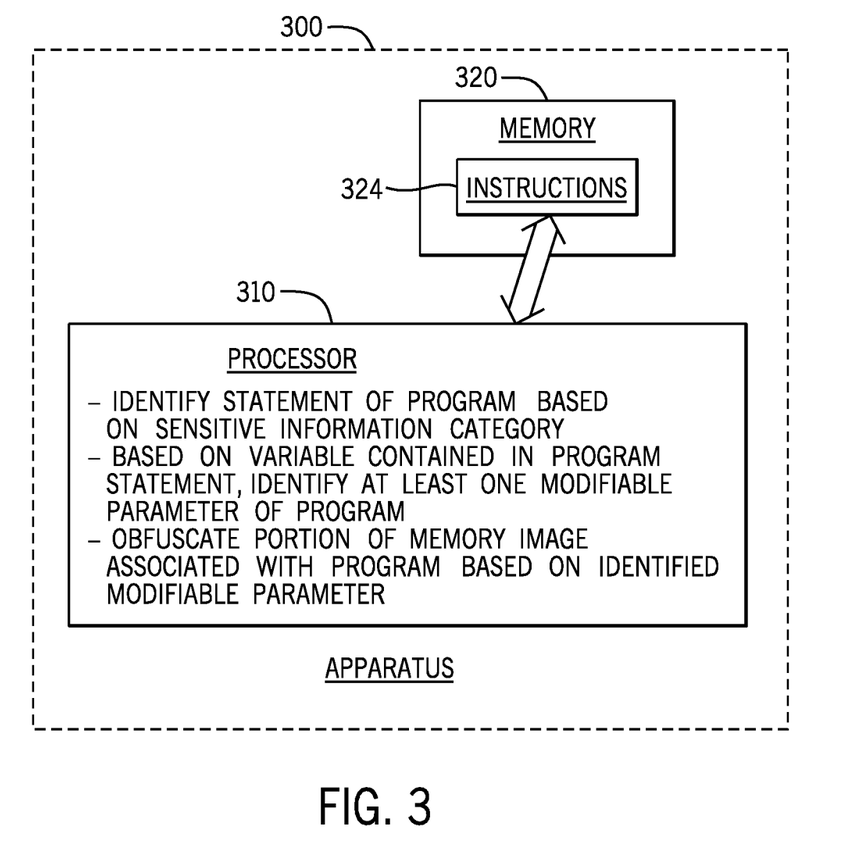
FIG. 3 is a schematic diagram of an apparatus to redact sensitive-information data from a core dump according to an example implementation.

Referring to FIG. 3, in general, in accordance with some implementations, the generation of the redacted core dump 224 may be performed by an apparatus 300 that is depicted in FIG. 3. In general, the apparatus 300 includes a processor 310 and a memory 320. The memory 320 contains instructions 324, which, when executed by the processor 310, cause the processor 310 to identify a statement of a program based on a sensitive-information category; based on a variable contained in the program statement; identify at least one MP of the program; and obfuscate a portion of a memory image that is associated with the program based on the identified MP.

As examples, the memory image may be data that represents a core dump, a heap dump (i.e., the data may represent one or multiple states of one or multiple heaps), or a thread dump (i.e., the data may represent one or multiple states of one or multiple threads).

As a more specific example, in accordance with example implementations, the MP identification engine 132 may use program slicing for purposes of identifying MPs associated with certain obfuscation categories. As a more specific example, the MP identification engine 132 may apply program slicing, as illustrated below for a set of example program instructions:

```
12  extern int toggle;
13  ...
14  int prepare_connection (long ipaddr, int port) {
15      int sockfd, status, *p;
16      struct sockaddr_in server, tmp;
17      ...
18      sockfd = socket (AF_INET, SOCK_STREAM, 0);
19      if (sockfd == -1)
20          error (-1, errno, " ");
21      ...
22      /* Set up IP address structure. */
23      memset (&server, 0, sizeof (server));
24      server.sin_family = AF_INET;
25      server.sin_addr.s_addr = htonl (ipaddr);
26      server.sin_port = htons (port);
27      ...
28      tmp = server;
29      ...
30      if (toggle)
31          p = malloc (sizeof (int));
32      *p = ... /* PROGRAM COULD CRASH HERE */
33      /* Invoke connect system call to initiate a socket connection. */
34      status = connect (sockfd, (struct sockaddr *) &tmp, sizeof (tmp));
35      ...
36      return sockfd;
37  }
```

Example 1

In Example 1, an attempt is made to connect to a socket at an IP address and port that are specified in formal parameters of a prepare_connection function. Lines 30, 31 and 32 of Example 1 perform an independent computation: in these lines, the function first conditionally targets the pointer "p" at a dynamically allocated memory address and then unconditionally updates the target of "p". A potential problem with the prepare_connection function of Example 1 is that the program may crash at line 32, depending on the undefined initial value of "p" at line 15 and whether the integer variable "toggle" is false. If the prepare_connection function's stack frame in the corresponding generated core dump is examined in a debugger, a sensitive IP address may be read from the data corresponding to the "ipaddr" integer. It is noted from Example 1 that the content of "ipaddr" is irrelevant to debugging the crash. In other words, the root cause of the crash may be determined even if the data content associated with the "ipaddr" input is obfuscated.

The "ipaddr" input is one example of a modifiable parameter, or "MP" (here, a modifiable input). As described herein, in accordance with example implementations, the MPs may include unextended modifiable inputs (MIs) that reside within a particular function, extended modifiable inputs (EMIs) that extend beyond a function's boundaries, and modifiable outputs (MOs). The unextended MIs (otherwise called "MIs" herein) are first described below.

MIs, such as "ipaddr", are identified through slicing criteria, in accordance with example implementations. A "slicing criterion" <S, V> for a program P is a statement S and a set of variables V in P. A "static slice" for the <S, V> slicing criterion is the set of statements in the program statement P that may directly or indirectly affect one or more variables in the set of variables V at the program statement S.

As an example of a slicing criterion <S, V>, the set of variables V may be {tmp} and the statement S may be the statement at line 34 of Example 1. The static slice BSL(S, V) for this <S, V> slicing criterion is as follows:

BSL(<34,{tmp}>)={28,26,25,24,23}

The value of the "tmp" integer at line 34 of Example 1 is assigned on line 28. In particular, the value of the "tmp" variable is assigned a value that the "server" variable is set to on lines 23 through 26. Moreover, the incoming "ipaddr" and "port" inputs are assigned to two of the server fields on lines 25 and 26 of Example 1. The MIs of a slicing criterion <S, V> may be defined to be the union of the set of variables V and the set of all modifiable inputs to the statement in the static slice BSL(<S, V>). The union is represented as MI(<S, V>).

For Example 1, Table 1 depicts the modifiable inputs to the statements in the static slice BSL(<34, {tmp}>):

TABLE 1

| Statement | Modifiable Input | Type of Modifiable Input | Obfuscation Category |
|---|---|---|---|
| 28 | server | struct sockaddr_in | IP Address |
| 26 | port | Int | IP Address |
| 25 | ipaddr | Long | IP Address |
| 24 | — | — | — |
| 23 | — | — | — |

In Table 1, the row for line 28 depicts the "server" input as the modifiable input for line 28. This is due to the statement "tmp=server". It is noted that there is no modifiable input for line 24 of Table 1. This is due to the input for line 24 being the constant "AF_INET". Therefore, for this example, the MIs may be represented as follows: MI(<34, {tmp}>) ={tmp, server, port, ipaddr}.

Thus, for this example, for purposes of ensuring that no information represented by the "ipaddr", "port", and "server" inputs is revealed, the data associated with these inputs is obfuscated (encrypted, for example).

As a more specific example for type-directed obfuscation using FPE, in line 26 of Table 1, the "port" input is the identified modifiable input. The program type of the "port" variable is an integer, which may, for example, be four bytes in size. Given the virtual address of the "port" input (as would be available from a core dump), FPE may be used to obfuscate the corresponding data by encrypting the four-byte integer at the virtual address. So for this example, the data type of the "port" input determines the domain that FPE uses to obfuscate the data corresponding to the "port" input.

For Table 1, the type of "server" is "struct sockaddr_in", which is a defined structure in the Linux IPv4 protocol. As an example, this structure may include the following three fields:

```
struct sockaddr_in {
sa_family_t sin_family; /* IP address family --- e.g., AF_INET. */
in_port_t sin_port; /* Port number, in Network Byte Order. */
struct in_addr sin_addr, /* IP address. */
...
}
```

As an example, an instance of the struct sockaddr_in structure may take up sixteen bytes. FPE may obfuscate the data corresponding to this structure by treating the "server" input as one sixteen-byte integer. This means that the sin_family field is also obfuscated. For the particular Example 1, obfuscating the sin_family data has no bearing on the crash at line 32. However, in some situations, encrypting all the fields of a data structure, such as the one identified above, may not be needed, because not all of the fields may correspond to sensitive information. In this manner, the sin_family field does not have content that could be regarded as being sensitive. A more precise analysis may be, for example, to consider the sin_port and sin_addr fields for encryption.

Hence, in accordance with example implementations, an entire structure may be encrypted if any field in it may hold sensitive information. Alternatively, in accordance with further implementations, sensitive fields of such a structure may be tracked and encrypted. The former approach, though less precise, may be easier to implement and may encrypt information that is irrelevant to most crashes. On the flip side, the former approach could also wastefully encrypt nonsensitive information that may be important to the crash investigation, because the encrypted result may have to be decrypted to aid in the investigation.

In general, an "obfuscation category" refers to a division of sensitive information to be collectively redacted. As examples, obfuscation categories may be IP Address, Credit Card Number, Salary, and so forth. In general, a set of slicing criteria (called "SC") is associated with an obfuscation category (called "OC" herein). This slicing criteria may be associated with obfuscation categories (i.e., SC(OC)) as follows: SC(OC)={<S, V>, <S', V'>, . . . }. The collection of variables in the SC(OC) slicing criteria is the set of variables with information that may contain sensitive information. For Example 1, the set of slicing criterion may be defined as follows: SC(IP Address)={<34, {tmp}>}.

After the slicing criteria that is associated with the obfuscation categories are known, slices for each category may then be determined. This permits the calculation of the slicing criteria's MIs. Each MI may then be obfuscated with FPE using that MI's type.

In accordance with example implementations, the slicing criteria for an obfuscation category may be determined by finding places in the source code that are known to read or write possibly sensitive values. These places, called "seeds" herein, may be the origination points of sensitive information. As an example, a seed may be an indication of a standard function whose return value or formal parameter may contain sensitive information.

As a more specific example, if $Y=F(X_1, X_2, X_3 \ldots)$ may be an invocation at a statement S of a standard function F whose argument $X_i$ ($i \geq 1$) could contain sensitive information in the obfuscation category OC. Then, for this example, <S, {Xi}> is added to SC(OC).

Seeds may be associated with program calls, in accordance with example implementations. For example, an invocation of a system call may be a seed. More specifically, in Example 1, "connect" is a Linux system call whose second formal parameter contains an IP address and port. This results in SC(IP Address) being set to {<34, {tmp}>} for Example 1.

As another example, a seed may be an invocation of a third-party library. More specifically, Example 2 below shows an invocation of EVP_EncryptUpdate, a function in the OpenSSL library. It is noted that the slicing criterion here includes "*ibuf" instead of "ibuf". This is because the sensitive information is the contents of the memory pointed to by "ibuf", not the content of "ibuf" itself.

```
40  int EVP_EncryptUpdate (EVP_CIPHER_CTX *ctx, unsigned
    char *obuf,
41              int *olen, const unsigned char *ibuf, int ilen);
42
43  if (!EVP_EncryptUpdate (&ctx, obuf, olen, ibuf, ilen)) {
44    /* Error */
45    return 0;
46  }
```

Example 2

As another example, a seed may be designated by a programmer annotation. In this manner, in accordance with example implementations, a seed may be any statement that uses or defines a variable that the programmer declares as containing possibly sensitive information. Example 3 below shows how a programmer annotation may be added using the C preprocessor's # pragma delimiter:

```
50  #pragma key_buff sensitive
51  char key_buff[128];
```

Example 3

For Example 3, the interpretation is that key_buff, once initialized, is to be treated as containing sensitive information.

Annotations may also be used to suppress treating a statement as a seed. For example, if the programmer is aware that a connect call at some statement takes publicly known IP addresses and ports, the programmer may annotate the program statements accordingly:

```
52  #pragma noseed
53  status = connect (sockfd, (struct sockaddr *) &tmp, sizeof (tmp));
```

Example 4

The above # pragma delimiter conveys that the statement that follows in line 53 should not be treated as a seed, although otherwise it may be treated as a seed using the example analyses described herein.

The MP identification engine 132 (FIG. 1) may perform an intraprocedural analysis, as described above, for purposes of identifying the MIs. The intraprocedural analysis does not consider statements outside of a given function, such as the example prepare_connection function. However, in accordance with example implementations, the MP identification engine 132 may propagate obfuscation information across function boundaries using an interprocedural extension to identify extended modifiable input (EMIs), another type of MP. As a specific example, it may be assumed that W=G(U1, U2, U3, ... ) is a statement R within a function H. Moreover, it may be assumed that an intraprocedural analysis of G has established that its jth formal parameter (j≥=1) is an unextended MI of some slicing criterion SCG of G. Then, a slicing criterion <R, {Uj}> is created, and the unextended modifiable inputs MI(<R, {Uj}>) are determined. The set union of MI(<R, {Uj}>) and MI(SCG) provide the EMIs of SCG, as described below:

$$EMI(SCG)=MI(<R,\{Uj\}>)\cup MI(SCG).$$

It may be assumed for purposes of this example, that the prepare_connection function of Example 1 was called from the prepare_socket function, as set forth below in Example 5:

```
60  int prepare_socket (long ipAddress, int portNo, int socketType) {
61    int socketDescriptor = 0;
62    ...
63    switch (socketType) {
64      case udp_server:
65      case tcp_server:
66      case tcp_client:
67        socketDescriptor = prepare_connection (ipAddress, portNo);
68        break;
69    }
70    ...
71    return socketDescriptor;
72  }
```

Example 5

Because "ipaddr" and "port" are unextended MIs of some slicing criterion of the prepare_connection function (i.e., <34, {tmp}>), the slicing criterion <67, {ipAddress, portNo}> may be created. Now, MI(<67, {ipAddress, portNo}>)={ipAddress, portNo}; and hence, EMI(<34, {tmp}>)={tmp, server, ipaddr, port, ipAddress, portNo}.

In accordance with example implementations, the MP data 140 (FIGS. 1 and 2) describing a program's MPs, such as the MIs and EMIs described above, once determined, may be retrieved, or stored, by the MP identification engine 132 (FIG. 1) for later access by the core dump redactor 220 (FIG. 2). In accordance with example implementations, a possible place for storing the MP data 140 is the memory space associated with the debug section of the program's compiled binary code. In accordance with further example implementations, the MP data 140 may be recorded in an auxiliary file. In accordance with example implementations, regardless of where stored, the MP data 140 for a given MP may represent several attributes for the MP, such as its symbol name, its size, the associated obfuscation category, and so forth.

Figure 4:
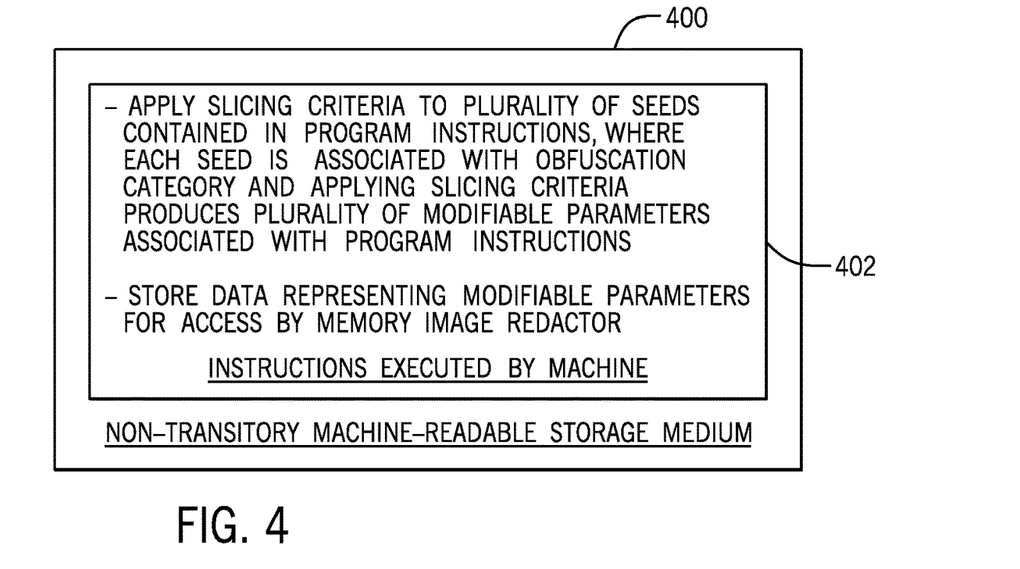
FIG. 4 is an illustration of a non-transitory computer-readable storage medium storing instructions that, when executed by a machine, cause the machine to redact sensitive-information data from a core dump according to an example implementation.

Thus, referring to FIG. 4, in accordance with example implementations, a non-transitory machine-readable storage medium 400 stores instructions 402 that, when executed by a machine, cause the machine to apply slicing criteria to a plurality of seeds contained in program instructions. Each seed of the plurality of seeds is associated with an obfuscation category of a plurality of obfuscation categories, and applying the slicing criteria produces a plurality of MPs associated with the program instructions. The instructions 402, when executed by the machine, cause the machine to store data representing the MPs for access by a memory image redactor.

Figure 5:
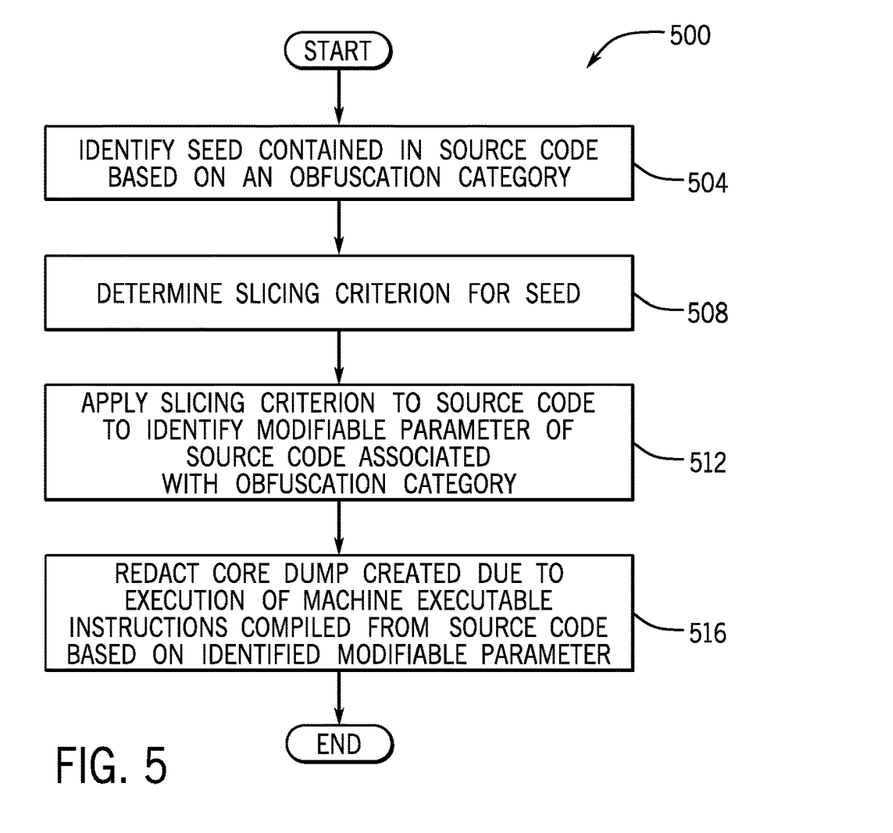
FIG. 5 is a flow diagram depicting a technique to redact sensitive-information data from a core dump according to an example implementation.

More specifically, in accordance with example implementations, a technique 500 (FIG. 5) may include identifying (block 504) a seed that is contained in source code based on an obfuscation category. The technique 500 includes determining (block 508) a slicing criterion for the seed; and applying (block 512) the slicing criterion to the source code to identify an MP of the source code, which is associated with the obfuscation category. The technique 500 includes redacting (block 516) a core dump created due to execution of machine-executable instructions compiled from the source code based on the identified MP.

Figure 6:
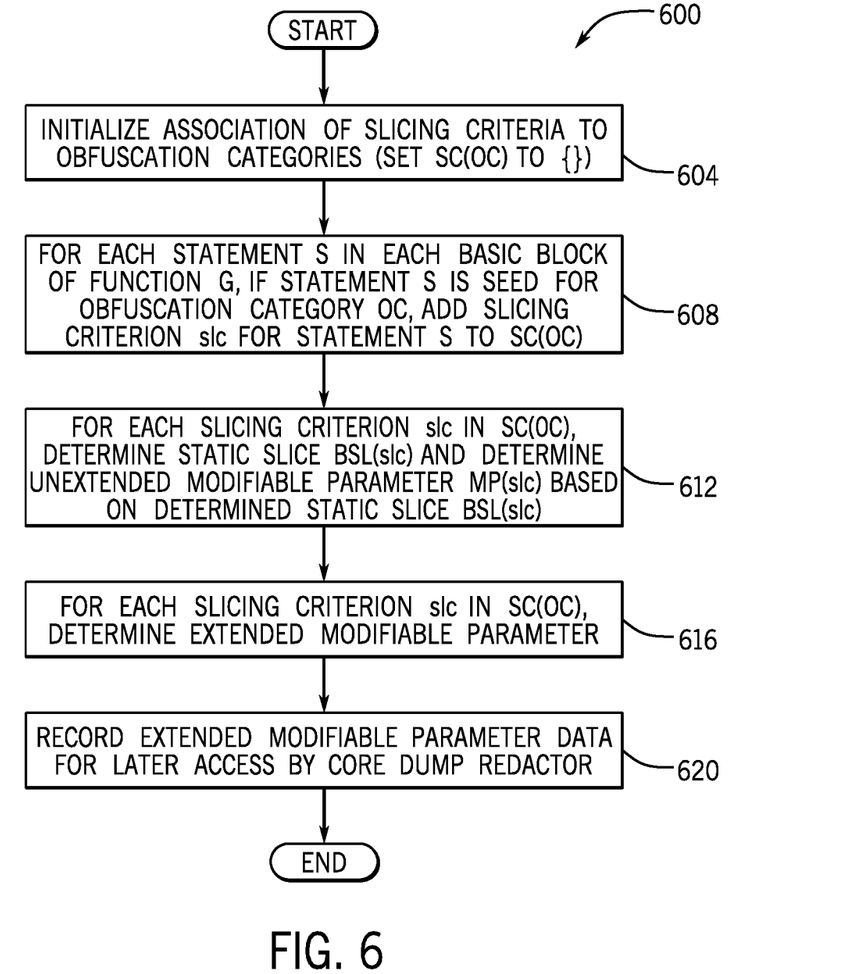
FIG. 6 is a flow diagram depicting a technique to identify MPs associated with obfuscation categories during compilation of source code according to an example implementation.

In accordance with some implementations, the MP identification engine 132 (FIG. 1) may perform a technique 600 (FIG. 6) after converting the functions of a program (represented by the source code 114) into the compiled blocks 134. More specifically, referring to FIG. 6 in conjunction with FIG. 1, in accordance with example implementations, the MP identification engine 132 initializes (block 604) the slicing criteria SC(OC) to obfuscation category OC to null, or { }. Next, pursuant to block 608, for each statement S in each basic block of a function G, if the statement S is a seed for the obfuscation category OC, the MP identification engine 132 adds slicing criterion for the statement S to the association SC(OC). Pursuant to block 612, for each slicing criterion slc in SC(OC), the MP identification engine 132 determines a static slice BSL(slc) and an unextended MP(slc). Moreover, pursuant to block 616, for each slicing criterion slc in SC(OC), the MP identification engine 132 determines corresponding extended MPs. Pursuant to block 620, the MP identification engine 132 records the extended MP data for later access by the core dump redactor 220.

In accordance with example implementations, the core dump redactor 220 may, in general, scan through the dump's symbols, and if the symbol is an MP parameter and belongs to an obfuscation category of interest, the core dump redactor 220 may then encrypt the associated value using FPE and write the encrypted value back to the core dump to form a corresponding part of the FPE-based redacted core dump 224.

Other implementations are contemplated, which are within the scope of the appended claims. For example, the slices discussed that are described above are "backward" slices because the slices are determined in the opposite direction from the program's flow. In accordance with example implementations, the MP identification engine 132 may also identify MPs using "forward" program slices. In this manner, a forward slice for <S, V> may be defined as the set of statements that may directly or indirectly use one or more variables in the variable set V defined at the statement S.

More specifically, Example 6 below depicts a call of EVP_DecryptUdate, an OpenSSL function, which decrypts "ilen" bytes pointed to by "ibuf" and writes the result to an array pointed to by "obuf". So SC(IP Address) for this example would be {<83, {*obuf}>}.

```
80  int EVP_DecryptUpdate (EVP_CIPHER_CTX *ctx, unsigned
char *obuf,
81              int *olen, const unsigned char *ibuf, int ilen);
82
83  if (!EVP_DecryptUpdate (&ctx, obuf, olen, ibuf, ilen)) {
84  /* Error */
85  return 0;
86  }
```

Example 6

The forward slices determine all statements that may consume "*obuf". When working with a forward slice, modifiable outputs are determined, which are the outputs determined by the statements in the slice. In the above Example 6, the modifiable outputs are the values written out by statements that directly or indirectly use "*obuf".

Different classes of sensitive information may be separately obfuscated. In this manner, in accordance with example implementations, each class may be associated with a key and supervisory rights. For example, FPE may independently encrypt credit card numbers and salaries in a core dump. The software authorized product provider may not access sensitive information to debug a crash when using a core dump. As such, the software provider may effectively work with the redacted core dump. In the case in which debugging relies on access to sensitive information, the provider may be provided access through one or multiple decryption keys. Even then, the access may be limited to specific classes of sensitive information that are relevant to the bug in question. In accordance with example implementations, the redacted core dump may be partially decrypted ensuring that sensitive information irrelevant to the relevant bug is not jeopardized. Thus, different degrees of access may be provided (via access to different encryption keys), each mapping to a different level of authority. For example, access to sensitive data for debugging purposes may be limited to developers with supervisory rights; and lower-level developers may work unabated with the encrypted core dump.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   identifying a seed contained in source code based on an obfuscation category, wherein the seed corresponds to a first statement of the source code associated with an origination of sensitive information;
   determining a slicing criterion for the seed, wherein the slicing criterion is associated with the obfuscation category and identifies the first statement and a variable of the first statement;
   applying the slicing criterion to the source code to identify a slice of statements of the source code capable of affecting a value assigned to the variable of the first statement;
   identifying a modifiable parameter other than the variable in the slice of statements; and
   redacting a core dump created due to execution of machine-executable instructions compiled from the source code based on the modifiable parameter.

2. The method of claim 1, wherein the modifiable parameter appears in a second statement of the slice of statements and does not appear in the first statement.

3. The method of claim 1, wherein:
   the source code comprises instructions;
   the first statement is contained within a pair of function boundaries of the instructions; and
   applying the slicing criterion to the source code to identify the slice of statements comprises processing statements of the instructions contained within the pair of function boundaries.

4. The method of claim 1, wherein:
   the source code comprises instructions;
   the first statement is contained within a pair of function boundaries of the instructions; and applying the slicing criterion to the source code to identify the slice of statements comprises processing statements of the instructions located outside of the pair of function boundaries.

5. The method of claim 1, wherein the source code comprises instructions and identifying the modifiable parameter comprises identifying a modifiable input of the instructions.

6. The method of claim 1, wherein the slice of statements does not include the first statement.

7. The method of claim 1, wherein the source code comprises instructions and identifying the modifiable parameter comprises identifying a modifiable output of the instructions.

8. The method of claim 1, wherein:
identifying the modifiable parameter comprises identifying a subset of fields of a plurality of fields of a programming structure of the source code; and
redacting the core dump comprises obfuscating parts of the core dump associated with the plurality of fields.

9. The method of claim 1, wherein:
identifying the modifiable parameter comprises identifying a subset of fields of a plurality of fields of a programming structure of the source code; and
redacting the core dump comprises obfuscating parts of the core dump associated with the subset of fields and leaving a portion of the core dump associated with the field or fields of the plurality of fields other than the subset of fields unaltered.

10. An apparatus comprising:
a processor; and
a memory to store instructions that, when executed by the processor, cause the processor to:
identify a seed contained in a program based on an obfuscation category, wherein the seed corresponds to a first statement of the program associated with an origination of sensitive information;
determine a slicing criterion for the seed, wherein the slicing criterion is associated with the obfuscation category and identifies the first statement and a variable of the first statement;
apply the slicing criterion to the program to identify a slice of statements of the program capable of affecting a value assigned to the variable of the first statement;
identify a modifiable parameter other than the variable in the slice of statements; and
obfuscate a portion of a memory image associated with the program based on the modifiable parameter.

11. The apparatus of claim 10, wherein the instructions, when executed by the processor, further cause the processor to obfuscate the portion of the memory image based on a first level of authority of a plurality of levels of authority and obfuscate another portion of the memory image based on a second level of authority of the plurality of levels of authority, wherein the first level of authority is different than the second level of authority.

12. The apparatus of claim 10, wherein the instructions, when executed by the processor, further cause the processor to identify the first statement as being an origination point of data associated with the obfuscation category.

13. The apparatus of claim 10, wherein the memory image is associated with a core dump, a heap dump, or a thread dump.

14. An article comprising a non-transitory machine-readable storage medium storing instructions that, when executed by a machine, cause the machine to:
identify a plurality of seeds contained in program instructions based on at least one obfuscation category, wherein the program instructions are arranged in a plurality of statements, and each seed of the plurality of seeds corresponds to a statement of the plurality of statements associated with an origination of sensitive information;
determine slicing criteria for the plurality of seeds, wherein each slicing criterion of the slicing criteria is associated with an obfuscation category of the at least one obfuscation category, and the each slicing criterion identifies a statement of the plurality of statements and a variable of the seed corresponding to the each slicing criterion;
apply the slicing criteria to the program instructions to identify corresponding sets of statements of the plurality of statements, wherein each set of statements of the sets of statements is associated with a slicing criterion of the slicing criteria and contains instructions capable of affecting the variable identified by the associated slicing criterion;
identify a plurality of modifiable parameters other than the variables; and
store the plurality of modifiable parameters for access by a memory image redactor.

15. The article of claim 14, wherein the instructions, when executed by the machine, further cause the machine to identify a system call or a library call associated with the at least one obfuscation category to identify at least one seed of the plurality of seeds.

16. The article of claim 14, wherein the instructions, when executed by the machine, further cause the machine to identify a programmer annotation associated with suppressing a program statement as being identified as a seed of the plurality of seeds or recognizing a program statement of the plurality of statements as being a seed of the plurality of seeds.

17. The article of claim 14, wherein the instructions, when executed by the machine, further cause the machine to store the plurality of modifiable parameters in a debugging section of compiled binary code.

18. The article of claim 14, wherein the instructions, when executed by the machine, further cause the machine to analyze a block of instructions generated by a compiler in response to compiling the program instructions to identify at least one seed of the plurality of seeds.

19. The article of claim 14, wherein the instructions, when executed by the machine, further cause the machine to modify a memory image based on the plurality of modifiable parameters by applying format-preserving encryption to data associated with the plurality of modifiable parameters.

20. The article of claim 14, wherein:
a given statement of the plurality of statements is contained within a pair of function boundaries; and
the instructions, when executed by the machine, further cause the machine to process statements of the plurality of statements located outside the pair of function boundaries to identify the given statement.

* * * * *